US 6,504,476 B1

(12) United States Patent
Wallrafen

(10) Patent No.: US 6,504,476 B1
(45) Date of Patent: Jan. 7, 2003

(54) METHOD FOR GENERATING A WARNING SIGNAL TO SWITCH ON THE LIGHTING SYSTEM OF A VEHICLE AND DEVICES FOR USE WITH SAID METHOD

(75) Inventor: Werner Wallrafen, Hofheim (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/424,679
(22) PCT Filed: May 26, 1998
(86) PCT No.: PCT/EP98/02902
§ 371 (c)(1),
(2), (4) Date: Mar. 6, 2001
(87) PCT Pub. No.: WO98/54029
PCT Pub. Date: Dec. 3, 1998

(30) Foreign Application Priority Data

May 28, 1997 (DE) .......................................... 197 22 227

(51) Int. Cl.$^7$ ................................................ B60Q 1/00
(52) U.S. Cl. .................... 340/457.2; 340/469; 340/539; 340/905; 307/10.8
(58) Field of Search ............................ 340/457.2, 469, 340/905, 539, 601, 600; 307/10.8; 315/82

(56) References Cited

U.S. PATENT DOCUMENTS

| 4,045,769 A | * | 8/1977 | Faller ......................... 340/469 |
| 4,376,909 A | * | 3/1983 | Tagami et al. ................ 315/82 |
| 4,665,321 A | * | 5/1987 | Chang et al. ................. 307/10 |
| 5,247,440 A | | 9/1993 | Capurka ................ 364/424.05 |
| 5,483,107 A | * | 1/1996 | Xander ....................... 307/10.8 |
| 5,729,214 A | * | 3/1998 | Moore ......................... 340/905 |
| 5,771,484 A | * | 6/1998 | Tognazzini ................. 701/117 |
| 5,973,618 A | * | 10/1999 | Ellis ............................ 340/990 |
| 6,008,732 A | * | 12/1999 | Lam ........................ 340/815.4 |
| 6,161,065 A | * | 12/2000 | Kamishima et al. .......... 701/36 |

FOREIGN PATENT DOCUMENTS

| DE | 2559184 | 7/1977 |
| DE | 3632818 | 4/1987 |
| DE | 29610507 | 8/1996 |
| FR | 1411513 | 12/1965 |

OTHER PUBLICATIONS

Patent Abstracts of Japan, vol. 007, No. 279 (M–262), Dec. 13, 1983 & JP 58 156428 A (Hitachi Seisakusho KK), Sep. 17, 1983.

* cited by examiner

Primary Examiner—Benjamin C. Lee
Assistant Examiner—Phung Nguyen
(74) Attorney, Agent, or Firm—Martin A. Farber

(57) ABSTRACT

In a method for producing a warning signal for switching on a vehicle lighting system when the environmental brightness is inadequate, the external light signal is transmitted as a radio signal, in a first step, and is received by the vehicle. In addition, further operating data are detected, an evaluation is then carried out by a control unit and, if necessary, a warning signal is produced for the operator. In an apparatus for use with the method there is control unit for detection and logic-processing of signals. This control unit produces a warning signal for the driver.

1 Claim, 3 Drawing Sheets

METHOD FOR GENERATING A WARNING SIGNAL TO SWITCH ON THE LIGHTING SYSTEM OF A VEHICLE AND DEVICES FOR USE WITH SAID METHOD

FIELD AND BACKGROUND OF THE INVENTION

The invention relates to a method for producing a warning signal for switching on a vehicle lighting system when the environmental brightness is inadequate on the basis of an external light signal, and to an apparatus for use with the method.

A method of the this type in general comprises a light-sensitive sensor which is fitted to the outside of a vehicle and produces an external light signal using which a warning signal is emitted to the operator, by means of a control unit. Sensors of this type have the disadvantage that they easily become dirty since, preferably, they must be arranged in an exposed position on unprotected bodywork elements. Malfunctions thus easily occur if, for example, dirt or snow partially or entirely covers the sensor. In consequence, the surface of the sensor must be cleaned regularly for correct operation.

It is likewise disadvantageous that the fitting of the sensor is linked to additional costs. Specific connections must be provided for the sensor and the capability to fit it to the outside of the bodywork must be provided, without any possibility of other components influencing the operation of the sensor. A further disadvantage is that the sensor, which can be seen from the outside, detracts from the visual appearance. In fact, the design and wind drag of modern vehicles require smooth bodywork surfaces. In this case, an additional bodywork opening interferes with the overall impression. A major disadvantage of these sensors results from their susceptibility to external light sources and the stray light which is present, particularly in a city area. This influence could lead to incorrect information being derived. Particularly in city areas, people frequently forget to switch on the vehicle lighting when it is dark. This is due to the residual light that is still present, as a result of which the operator is not immediately aware that his lighting is not switched on. The design of such sensors must therefore always remain a compromise since, on the one hand, insensitive design of the sensor, which does not produce a sensor signal until it is completely dark, does not produce any warning signal in twilight while, on the other hand, a sensitive sensor design leads to unnecessary warning signals. Furthermore, no clear decision to switch on the lighting system is provided in the transitional region (half-light).

SUMMARY OF THE INVENTION

The invention is based on the problem of developing a method for producing a warning signal for switching on a vehicle lighting system on the basis of an external light signal, when the environmental brightness is inadequate, which method functions reliably irrespective of disturbance influences. Furthermore, it is intended to provide an apparatus for use with the method.

The first-mentioned problem is solved according to the invention in that in a first step, the external light signal is transmitted as a radio signal, is received by the vehicle and operating data of the vehicle are detected, wherein, subsequently, the data are evaluated by means of a control unit and, finally, a warning signal is produced for information of the operator. The vehicle driver makes the final decision to switch on the lighting.

This method makes it possible in a particularly advantageous manner to identify the external light without having to fit a sensor to the vehicle for this purpose. In consequence and in particular, manufacture becomes cheaper. Furthermore, no additional bodywork opening is required when the method is used, thus improving the visual appearance. The method is largely insensitive to disturbance influences and allows a warning signal to be produced irrespective -of the location of the vehicle.

The method according to the invention can be particularly simple and existing facilities if the radio signal is received by means of a radio arranged in the vehicle. The transmitting stations can easily transmit the desired information and, in many cases, already have facilities for transmitting imperceptible, audible signals. Furthermore, radios are nowadays already fitted in most vehicles. A considerable proportion of those driving in the traffic could thus be reached within a short time. The regional reception range for VHF radio is virtually homogeneously uniform.

Signals which can be received reliably beyond specific regions are particularly highly suitable for carrying out the method according to the invention. The facilities of modern telecommunications systems can advantageously be used if the radio signal is received by means of a radio telephone arranged in the vehicle, in particular a car telephone.

With the method according to the invention, the signals are transmitted in a particularly simple manner if the radio signal includes data relating to the environmental brightness, which allow the control unit to subdivide into adequate and inadequate environmental brightness, by which means the evaluation and further-processing can be carried out particularly easily within the control unit. The received signal can be converted directly into a warning signal. Existing facilities can thus easily be retrofitted, or are already able to process such signals.

In order to supply the vehicle driver with the information that is important to him at all times, it is desirable if the warning signal for switching on the lighting system appears only when this system is not already switched on. For this purpose it is particularly advantageous if the control unit detects the radio signal with data relating to the environmental brightness and detects the switching state of the vehicle lighting system, and produces a warning signal only if the vehicle lighting system is switched off and the environmental brightness is inadequate.

In practice, interference with the reception of the signal can never be completely precluded. In this context, an embodiment of the method according to the invention is particularly advantageous in which the radio signal includes the time of the start and the time of the end of the adequate environmental brightness. These two times are expediently stored until they are overwritten by more up-to-date data. From experience, the times change only quite slowly over the course of the calendar year so that a failure of the receiving device in the vehicle would not result in any serious limitation on operation even over a lengthy time period, for example several days.

The time of the start and the time of the end of the adequate environmental brightness must be compared with the respective current real time for further evaluation. To do this, it is particularly advantageous if the control unit detects the real time by means of a clock arranged in the vehicle.

A further, particularly advantageous embodiment of the method, in which the control unit detects the real time by means of a receiver for receiving radio clock signals, considerably improves the immunity to disturbance influences.

The signals from the radio clock correct the possible error caused, for example, by a failure of the power supply, and also reliably ensure the correct time setting even when time changes occur. If the radio link is interrupted, the clock continues to run with sufficient accuracy until new signals are received. A configuration is also feasible in which the clock does not physically exist, and the signals from the radio clock are merely input directly into the control unit.

The method according to the invention operates reliably if the control unit detects the time of the start of the adequate environmental brightness, of the end of the adequate environmental brightness, the real time and the switching state of the vehicle lighting system, and produces a warning signal if the real time is between the time of the start of the adequate environmental brightness and the time of the end of the adequate environmental brightness and the vehicle lighting system is switched off.

In practice, it is frequently necessary for a warning signal to be produced only when the vehicle is actually being driven. This can be achieved according to another development of the invention if the control unit detects the speed of the vehicle and produces a warning signal only if the speed is not zero.

Even in the daytime, it is often necessary to switch on the vehicle lighting system. This is the case, for example, in tunnels, where people particularly frequently forget to switch on the lighting system. Reliable identification of such danger points can also be achieved, according to a further version of the method according to the invention, if the start and end of the danger point are each provided with a transmitting device which transmits an additional signal which can be identified by the control unit.

Particular danger points can be safeguarded by appropriate warning signals even with the already existing facilities. Navigation systems (GPS) which operate with satellites provide suitable preconditions for this purpose. An appropriate development of the method provides that the control unit detects signals for determining the geographical position, for example by means of a navigation device, and produces a warning signal if the vehicle is located in the vicinity of an area which is screened from the environmental brightness, in particular an underpass, a tunnel etc.

For vehicle drivers, information which also takes account of particular regulations to switch on the lighting system in various regions or sovereign territories is particularly valuable. For example, the lighting system always has to be switched on throughout the day in Scandinavian countries. The present invention is particularly advantageously developed if the control unit receives the signals of a navigation device for detecting the geographical position, matches the position to a road map and produces a warning signal if the vehicle is located in a region in which there is a necessity or a requirement to drive with the lighting system switched on even if the environmental brightness is adequate.

The second-mentioned problem, of providing an apparatus for use with the method, is solved according to the invention in that the means for identifying the external light is a radio signal receiver, in that the control unit has a device for detecting at least one of the following operating data items: switching state of the light switch, speed of the vehicle, real time, geographical position and a radio signal, and in that, furthermore, a switching element is provided for logically linking the switching states, and a device is provided for producing a warning signal.

An apparatus which does not react sensitively to the interruption of the radio transmission of the signals is achieved by a further embodiment (according to the invention) of the invention if the control unit has a memory unit. The stored data remain in the memory unit at least until more up-to-date signals can be received.

In practical use, the warning signal must not distract the attention of the vehicle driver. A warning signal which is easily perceptible but nevertheless neither startles the vehicle driver nor demands an immediate reaction from him is provided in a particularly advantageous development of the invention if the warning signal for information of the operator is visual warning information, in particular a text display.

The effect is improved by arranging such a display centrally, particularly in the driver's continuous field of view, where it is difficult to overlook. One advantageous embodiment, in which the display is arranged in the instrument panel, can be produced in particular with the inclusion of existing digital display apparatuses.

The method according to the invention and the apparatus for use with the method allow various modifications.

BRIEF DESCRIPTION OF THE DRAWING

In order to explain the invention further, the following text refers to the figures of the drawings, in which.

DETAILED DESCRIPTION OF THE PREFERRED EMBODIMENT

Figure 1:
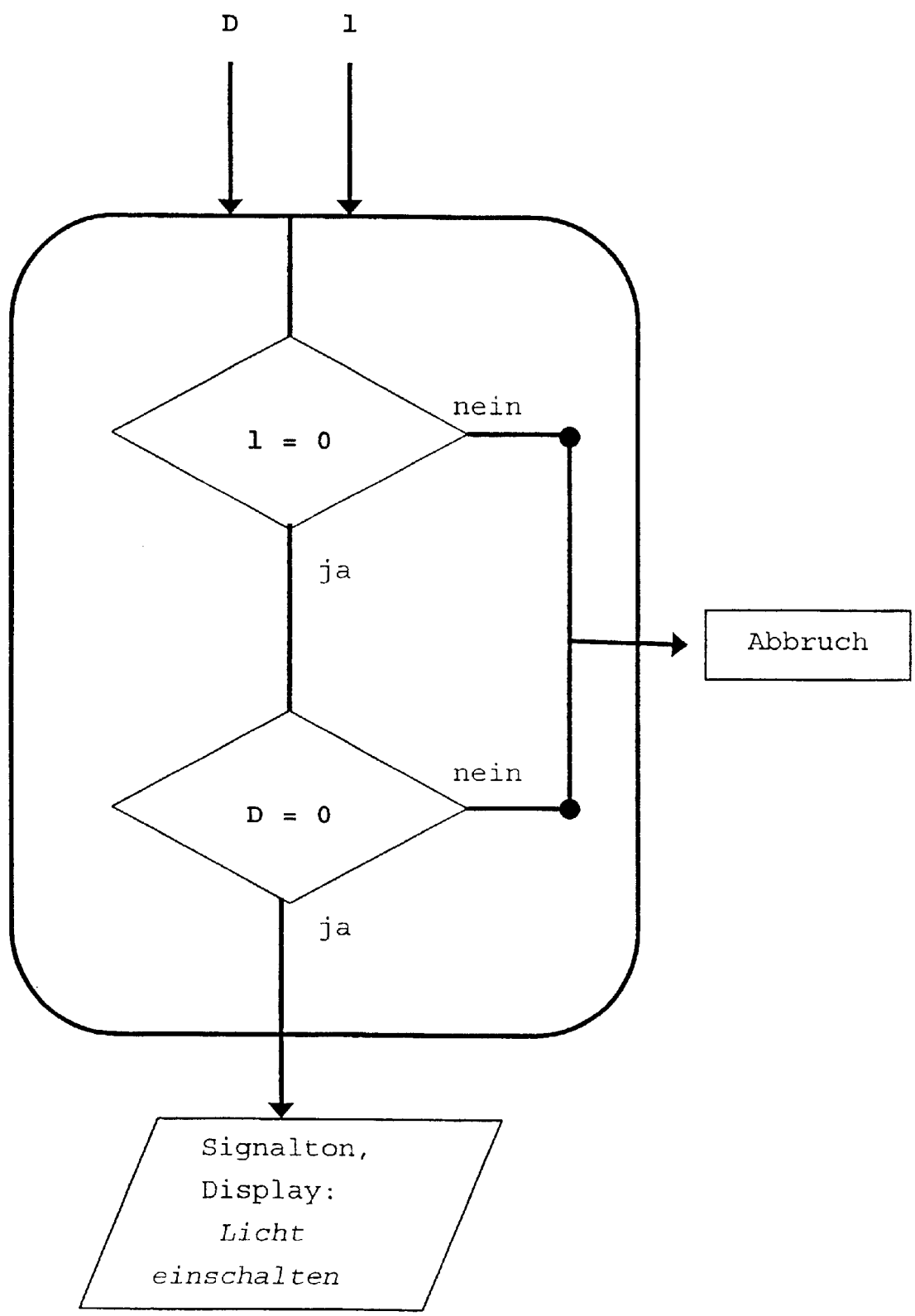
FIG. 1 shows a flowchart of the signal processing within the control unit, with two input signals.

FIG. 1 shows a flowchart of the signal processing within the control unit. The two input signals are denoted by D for the radio signal for the environmental brightness, and I for the switching state of the light switch. The signals may in this case each assume either the values 0 or 1, to be precise 0 for "darkness" or "light switched off", and 1 for "brightness" or "light switched on". The logic processing within the control unit produces an output signal, for example a signal tone or an indication on a display "switch on light" only when the signal "0" for light switched off follows the signal "0" for inadequate environmental brightness. If one of the two signals has the value "1", this leads to the end.

Figure 2:
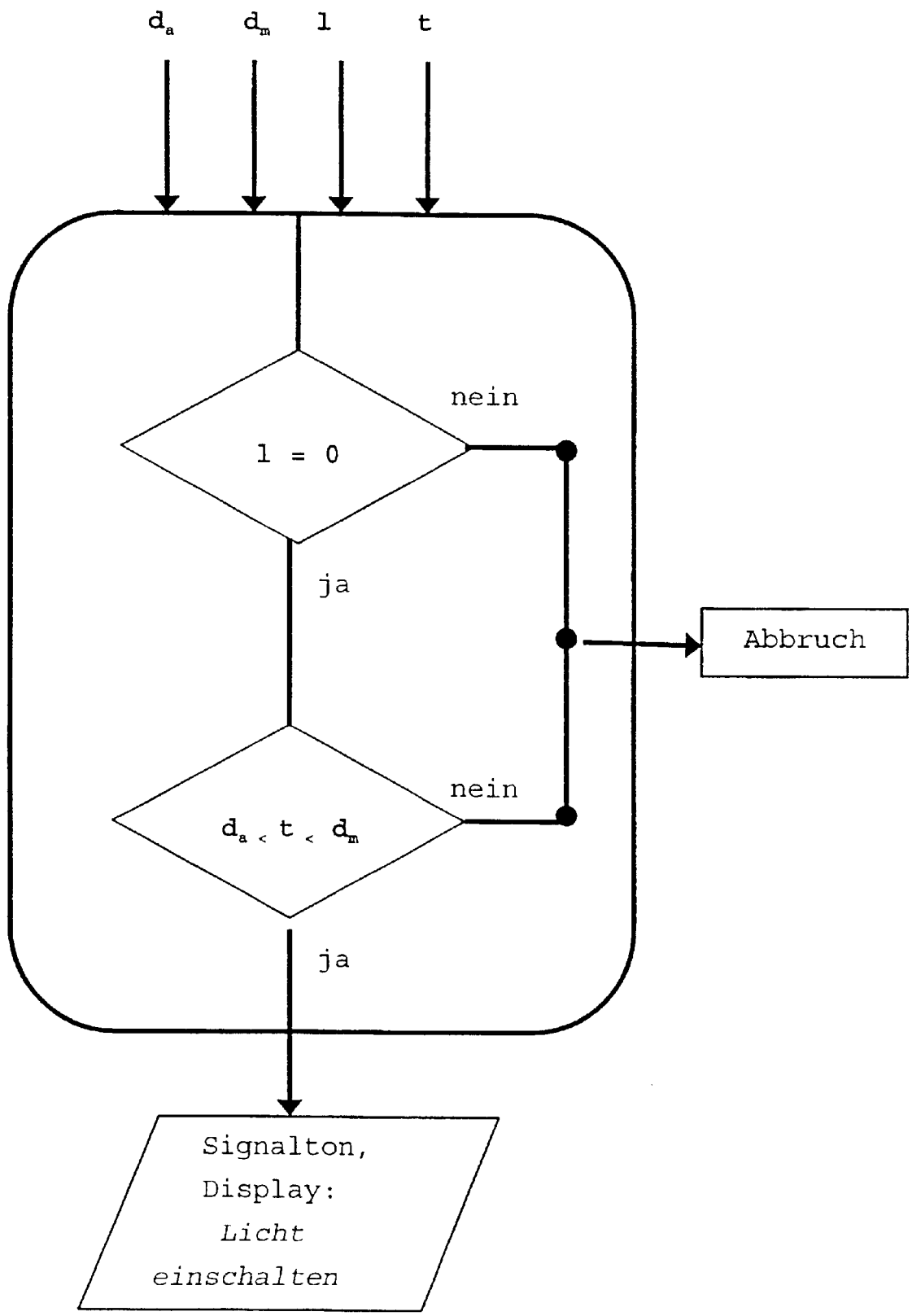
FIG. 2 shows a flowchart of the signal processing within the control unit, with three input signals.

FIG. 2 shows a further flowchart of the signal processing according to the invention. With this method, the input signals of the control unit comprise the variables $d_a$ and $d_m$ for the start and end of darkness, I for the switching state of the light switch, and t for the instantaneous real time within the control unit. In this method, the control unit produces a warning signal only when the light is switched off (I=0) and the instantaneous real time is in the time period bounded by the start and end of darkness ($d_a$ and $d_m$) The warning signal optionally comprises a signal tone or an indication on a display, or else a combination of both.

Figure 3:
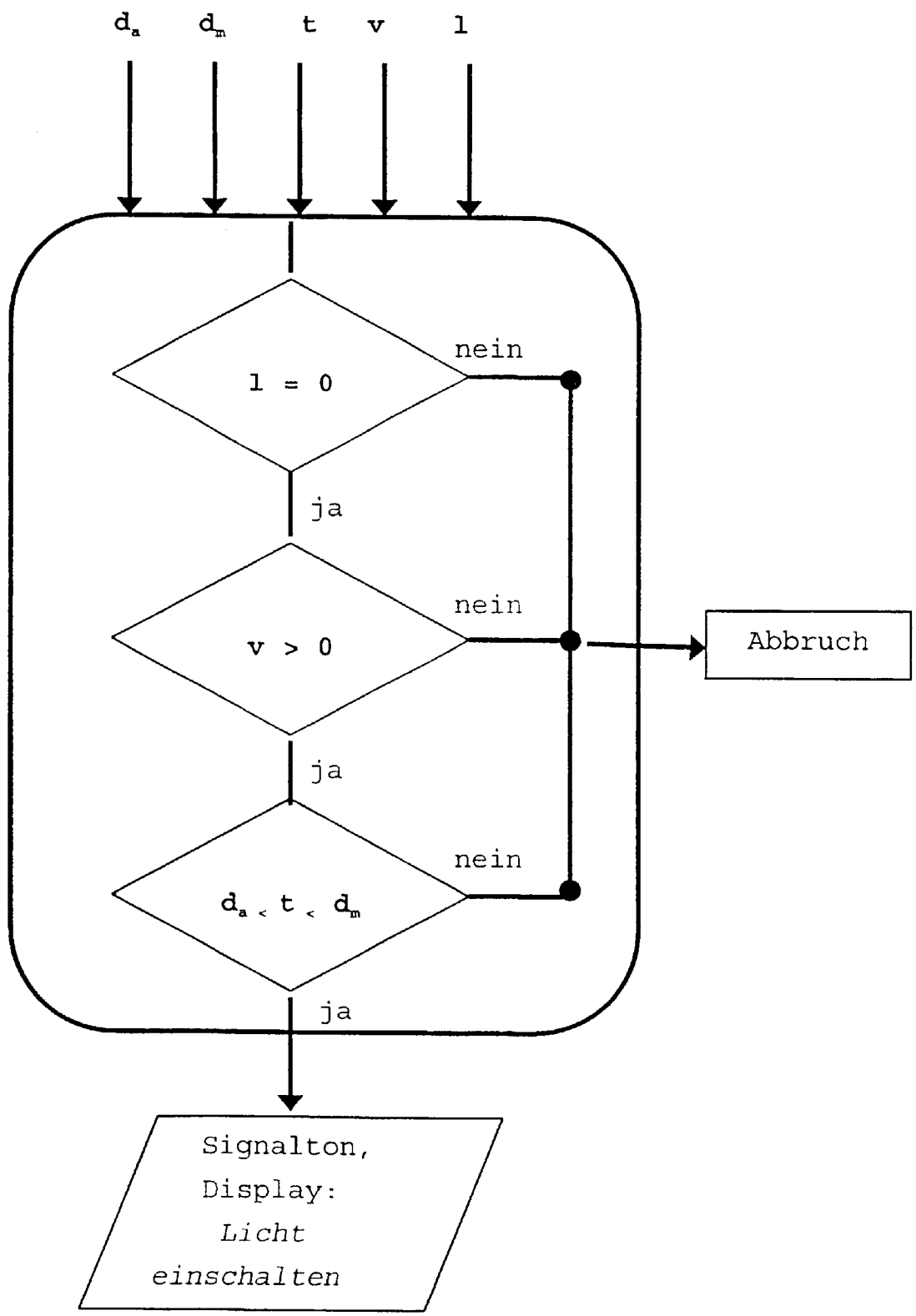
FIG. 3 shows a flowchart of the signal processing within the control unit, with four input signals.

The signal processing flowchart shown in FIG. 3 differs from the flowchart shown in FIG. 2 only by the additionally detected signal variable v for the speed of the vehicle. Accordingly, the signal processing once again leads to the end if the detected speed is equal to zero. The warning signal once again optionally comprises an audible warning tone, a visual indication or a combination of both.

In principle, the sequence of the processing of the various signals for the flowcharts shown in FIGS. 1 to 3 is irrelevant.

The illustration shows a procedure which initially starts with the evaluation of the vehicle's own signals, followed by evaluation of the radio signals.

I claim:

1. A method for producing a warning signal for switching on a vehicle lighting system when the environmental brightness is inadequate on the basis of an external light signal, wherein, in a first step, transmitting the external light signal as a radio signal, receiving the signal by the vehicle and detecting operating data of the vehicle, wherein subsequently, evaluating the data by means of a control unit on board the vehicle and, producing a warning signal for information of the operator;

wherein the control unit detects said radio signal with data relating to the environmental brightness and detects a switching state of the vehicle lighting system;

wherein the control unit receives signals of a navigation device and determines geographical position from the navigation-device signals, and matches the position to a road map for production of a warning signal if the vehicle is located in a region in which there is a necessity or a requirement to drive with the lighting system switched on even if the environmental brightness is adequate; and the control unit produces a warning signal if the vehicle lighting system is switched off and the environmental brightness is inadequate even if the geographical position from the navigation-device signals does not match the road-map position, the control unit logically linking switching states for production of the warning signal based on environmental brightness and geographic constraints.

* * * * *

UNITED STATES PATENT AND TRADEMARK OFFICE
CERTIFICATE OF CORRECTION

PATENT NO.     : 6,504,476 B1                                                                Page 1 of 1
DATED          : January 7, 2003
INVENTOR(S)    : Werner Wallrafen It is certified that error appears in the above-identified patent and that said Letters Patent is hereby corrected as shown below:

<u>Title page,</u>
Item [22], PCT Filed: change "May 26, 1998" to -- May 16, 1998 --.
Item [86], PCT No: § 371 (c)(1), (2), (4) Date: change "Mar. 6, 2001" to
-- Mar. 6, 2000 --.

Signed and Sealed this

Sixteenth Day of December, 2003

JAMES E. ROGAN
*Director of the United States Patent and Trademark Office*